(12) United States Patent
Hemphill et al.

(10) Patent No.: US 9,422,837 B2
(45) Date of Patent: Aug. 23, 2016

(54) CAMSHAFT PHASER WITH TWO ONE-WAY WEDGE CLUTCHES

(71) Applicant: Schaeffler Technologies AG & Co. KG, Herzogenaurach (DE)

(72) Inventors: Jeffrey Hemphill, Copley, OH (US); Philip George, Wooster, OH (US); Craig Dupuis, Windsor (CA); Brian Lee, York, SC (US); Matthew Evans, Warren, MI (US); Debora Manther, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/686,478

(22) Filed: Apr. 14, 2015

(65) Prior Publication Data

US 2015/0300214 A1 Oct. 22, 2015

Related U.S. Application Data

(60) Provisional application No. 61/980,913, filed on Apr. 17, 2014.

(51) Int. Cl.
*F01L 1/34* (2006.01)
*F01L 1/344* (2006.01)
*F01L 1/352* (2006.01)

(52) U.S. Cl.
CPC ............. *F01L 1/34409* (2013.01); *F01L 1/352* (2013.01)

(58) Field of Classification Search
CPC ............................... F01L 1/34409; F01L 1/352
USPC ........................................... 123/90.15, 90.17
See application file for complete search history.

(56) References Cited

U.S. PATENT DOCUMENTS 6,481,401 B1 * 11/2002 Schafer ................. F01L 1/3442
123/90.12
2013/0284139 A1 10/2013 Staley

* cited by examiner

*Primary Examiner* — Zelalem Eshete
(74) *Attorney, Agent, or Firm* — Simpson & Simpson, PLLC

(57) ABSTRACT

A camshaft assembly, including a camshaft phaser with: stator; rotor including first plurality of circumferentially aligned ramps; and second plurality of circumferentially aligned ramps offset from the first plurality of ramps in a first axial direction; first and second wedge plates radially disposed between the rotor and the stator; and camshaft non-rotatably connected to the rotor. In a drive mode: the stator is arranged to receive first torque and to rotate in a first direction; the assembly is arranged to operate in successive cycles of a first phase followed by a second phase; in the first phase the first wedge plate non-rotatably connects the stator and the rotor while the second wedge plate is rotatable with respect to the stator; and in the second phase, the second wedge plate non-rotatably connects the stator and the rotor while the first wedge plate is rotatable with respect to the stator.

20 Claims, 14 Drawing Sheets

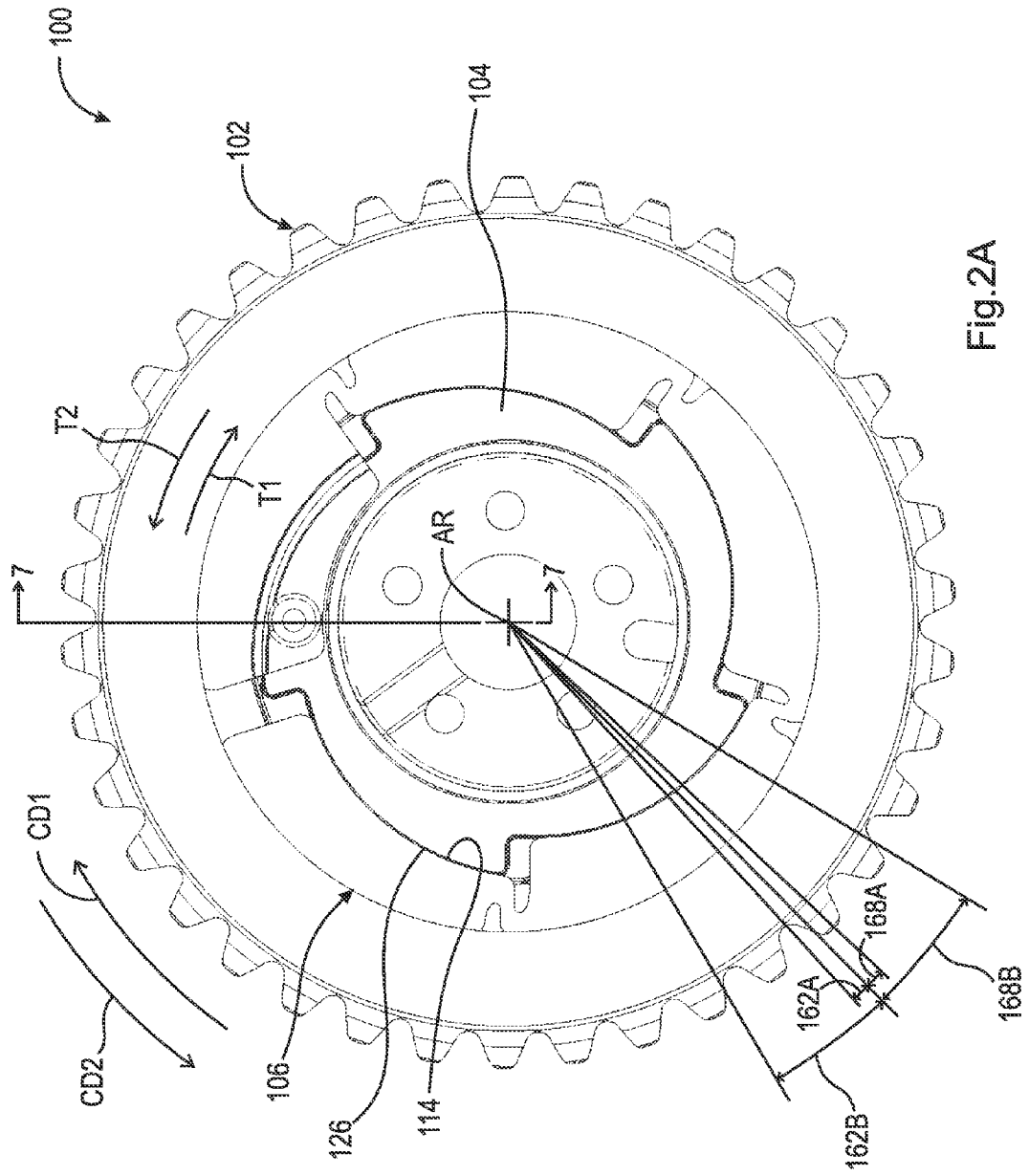

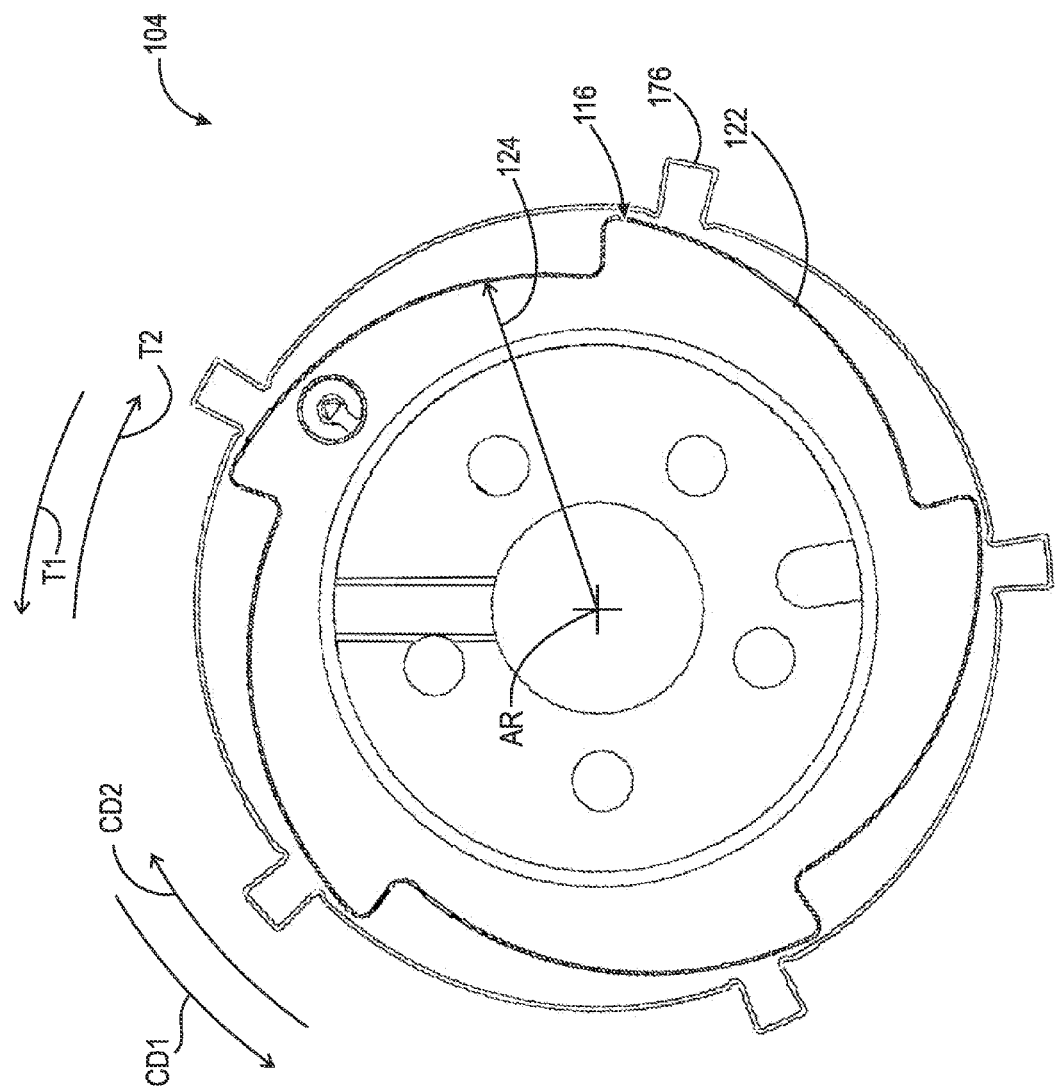

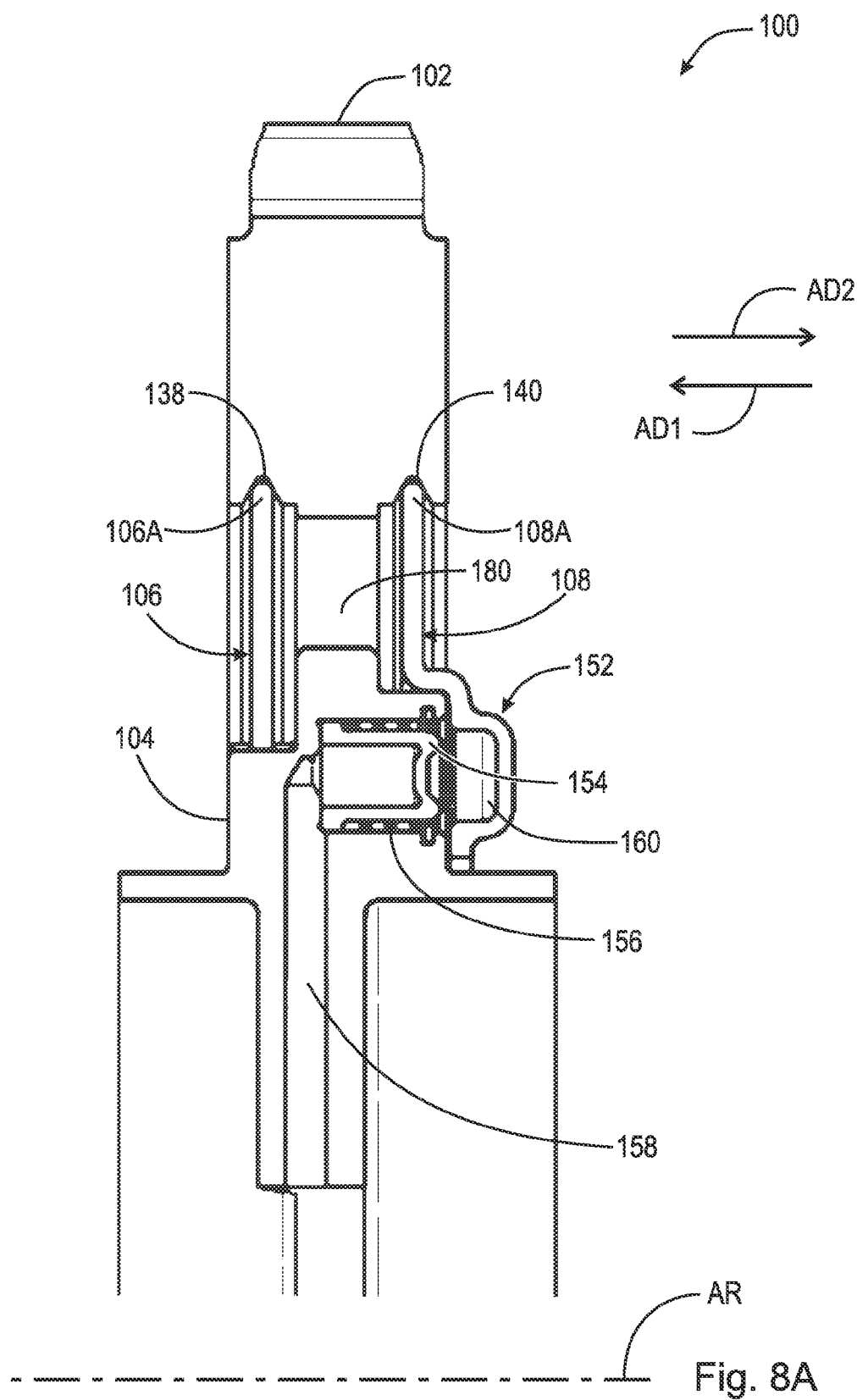

US 9,422,837 B2

CAMSHAFT PHASER WITH TWO ONE-WAY WEDGE CLUTCHES

CROSS-REFERENCE TO RELATED APPLICATIONS

This application claims the benefit under 35 U.S.C. §119 (e) of U.S. Provisional Patent Application No. 61/980,913, filed Apr. 17, 2014, which application is incorporated herein by reference in its entirety.

TECHNICAL FIELD

The present disclosure relates to a camshaft phaser with two-way wedge clutches. In particular, the two-way wedge clutches are used to transmit rotation of a stator to a rotor while accounting for oscillating torsional forces transmitted to the rotor by a camshaft. The two-way wedge clutches are also used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls.

SUMMARY

According to aspects illustrated herein, there is provided a camshaft phaser, including a rotatable stator including a radially inner side with first and second grooves; rotatable rotor arranged to non-rotatably connect to a camshaft and including a radially outer surface including first plurality of circumferentially disposed ramps, a respective radially outermost surface of each ramp in the first plurality of circumferentially disposed ramps extending further in a radially outer direction along a first circumferential direction; and second plurality of circumferentially disposed ramps, a respective radially outermost surface of each ramp in the second plurality of circumferentially disposed ramps extending further in a radially outer direction along a second circumferential direction, opposite the first circumferential direction; a first wedge plate including a third plurality of circumferentially disposed ramps engaged with the first plurality of circumferentially disposed ramps and first radially outermost portion at least partially disposed in the first groove; and second wedge plate including fourth plurality of circumferentially disposed ramps engaged with the second plurality of circumferentially disposed ramps; and second radially outermost portion at least partially disposed in the second groove.

According to aspects illustrated herein, there is provided a camshaft assembly, including camshaft phaser including: stator; rotor including first plurality of circumferentially aligned ramps; and second plurality of circumferentially aligned ramps offset from the first plurality of ramps in a first axial direction; first and second wedge plates radially disposed between the rotor and the stator; and camshaft non-rotatably connected to the rotor. In a drive mode: the stator is arranged to receive first torque and to rotate in a first direction; the assembly is arranged to operate in successive cycles of a first phase followed by a second phase; in the first phase the first wedge plate non-rotatably connects the stator and the rotor while the second wedge plate is rotatable with respect to the stator; and in the second phase, the second wedge plate non-rotatably connects the stator and the rotor while the first wedge plate is rotatable with respect to the stator.

According to aspects illustrated herein, there is provided a method of phasing a camshaft, including: engaging a radially outermost portion of a first wedge plate with a stator for a camshaft phaser; engaging a first plurality of ramps on the first wedge plate with a second plurality of ramps on a rotor for the camshaft phaser; engaging a radially outermost portion of a second wedge plate with the stator; engaging a third plurality of ramps on the second wedge plate with a fourth plurality of ramps on the rotor; rotating the stator in a first direction; rotating, via contact with the stator, the first wedge plate in the first direction; transmitting first torque in the first direction from a camshaft to the rotor; rotating the rotor a first circumferential distance in the first direction with respect to the stator; sliding the second plurality of ramps along the first plurality of ramps to displace the first wedge plate radially outward; non-rotatably connecting the rotor, the first wedge plate, and the stator; transmitting second torque in a second direction, opposite the first direction, from the camshaft to the rotor; rotating the rotor a second circumferential distance in the second direction with respect to the stator; sliding the fourth plurality of ramps along the third plurality of ramps to displace the second wedge plate radially outward; and non-rotatably connecting the rotor, the second wedge plate, and the stator.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2A is a front view of a camshaft phaser with two-way wedge clutches;

FIG. 5 is a rear perspective view of the rotor for the camshaft phaser in FIGS. 2A and 2B;

FIG. 8A is a cross-sectional view generally along line 8-8 in FIG. 2B with a locking pin assembly in a disengaged mode;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
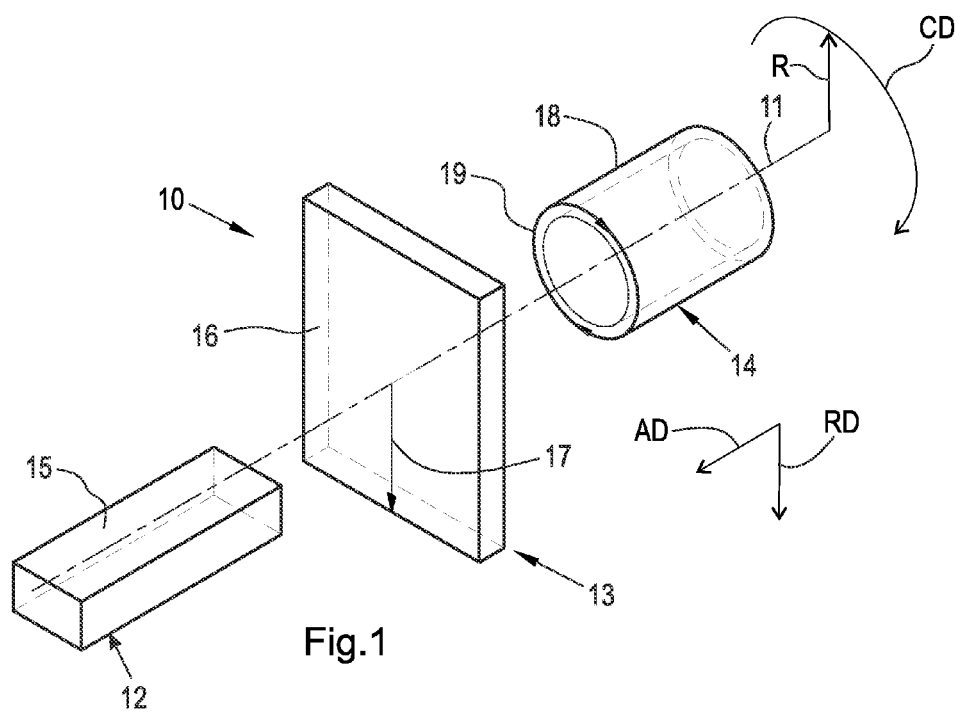
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

FIG. 2A is a front view of camshaft phaser 100 with two-way wedge clutches.

Figure 2B:
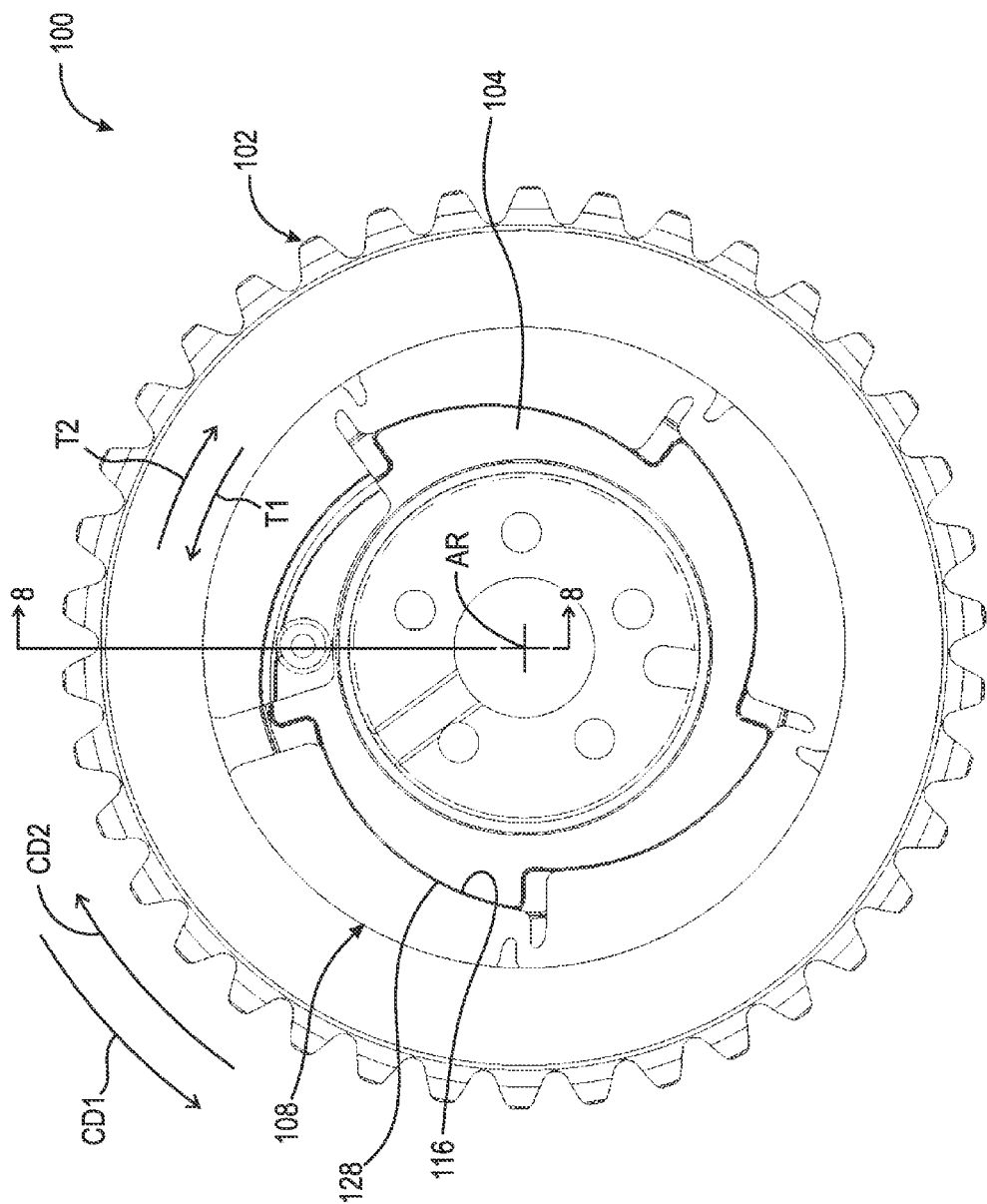
FIG. 2B is a rear view of the camshaft phaser in FIG. 2A.

FIG. 2B is a rear view of camshaft phaser 100 in FIG. 2A.

Figure 3:
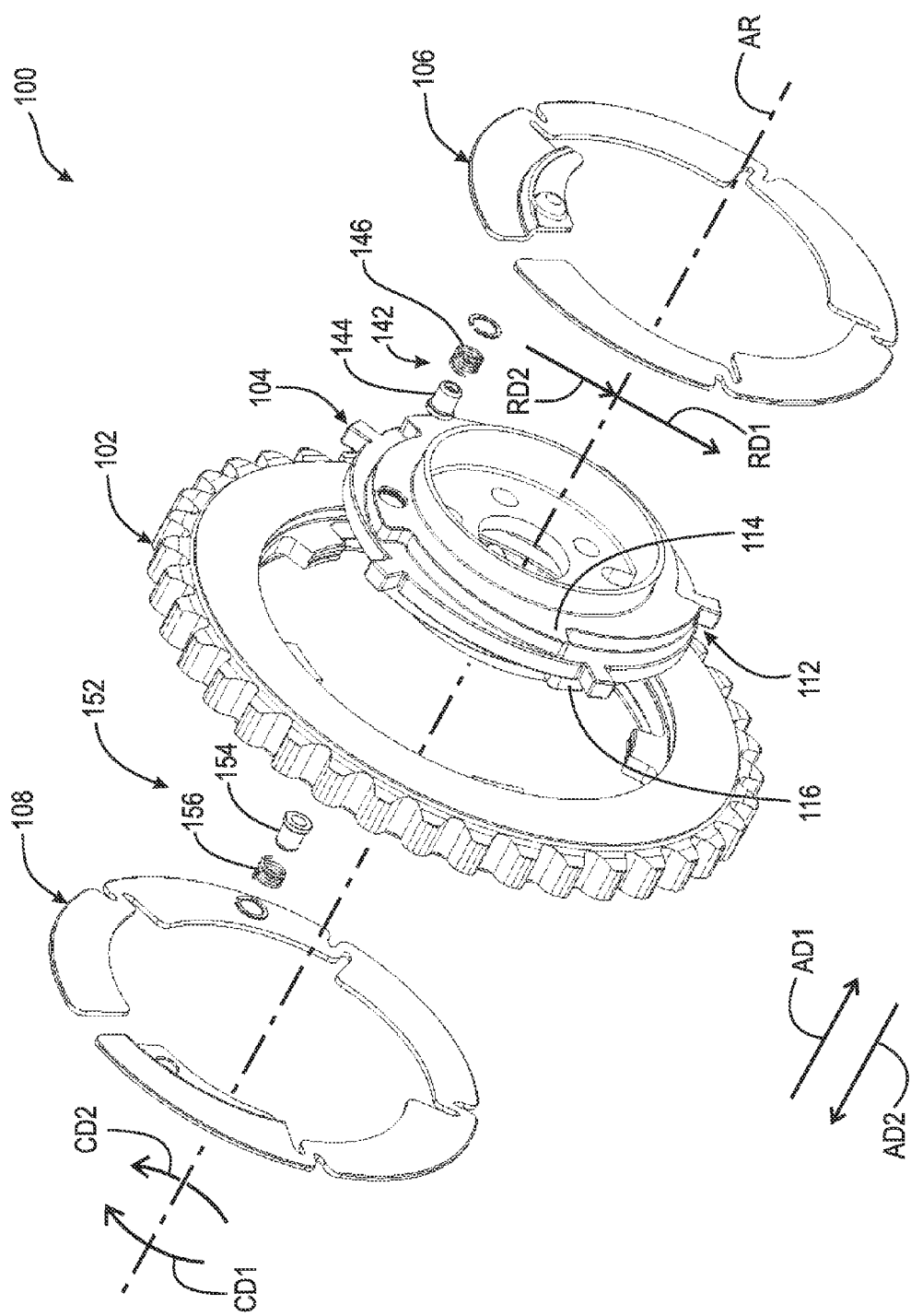
FIG. 3 is a perspective exploded view of the camshaft phaser in FIGS. 2A and 2B.

FIG. 3 is a perspective exploded view of camshaft phaser 100 in FIGS. 2A and 2B.

Figure 4:
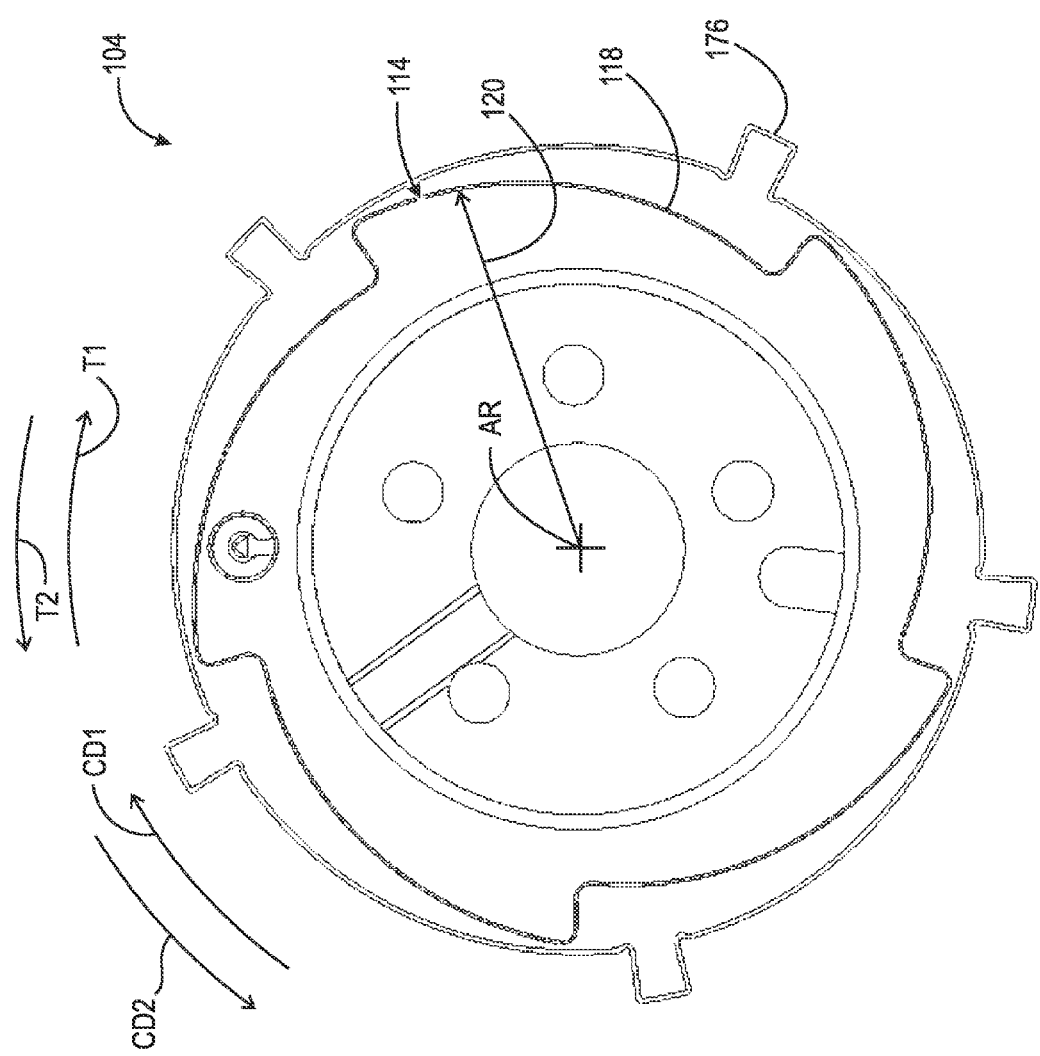
FIG. 4 is a front perspective view of a rotor for the camshaft phaser in FIGS. 2A and 2B.

FIG. 4 is a front perspective view of a rotor for camshaft phaser 100 in FIGS. 2A and 2B.

FIG. 5 is a rear perspective view of the rotor for camshaft phaser 100 in FIGS. 2A and 2B. The following should be viewed in light of FIGS. 2 through 5. Phaser 100 includes: axis of rotation AR, rotatable stator 102, rotatable rotor 104, and wedge plates 106 and 108. Rotor 104 is arranged to non-rotatably connect to a camshaft (discussed further below) and includes radially outer surface 112 with circumferentially disposed ramps 114 and 116. Ramps 114 are separated from ramps 116 in axial direction AD1. Stator 102 is rotatable in circumferential directions CD1 and CD2. Wedge plates 106 and 108 are frictionally engaged with stator 102 and rotate with the rotor except as noted below.

Radially outermost surface 118 of ramps 114 extend further in radially outer direction RD1 along circumferential direction CD2. That is, radial distance 120 increases along direction CD2. Radially outermost surface 122 of ramps 116 extend further in radially outer direction RD1 along circumferential direction CD1. That is, radial distance 124 increases along direction CD1.

Figure 6A:
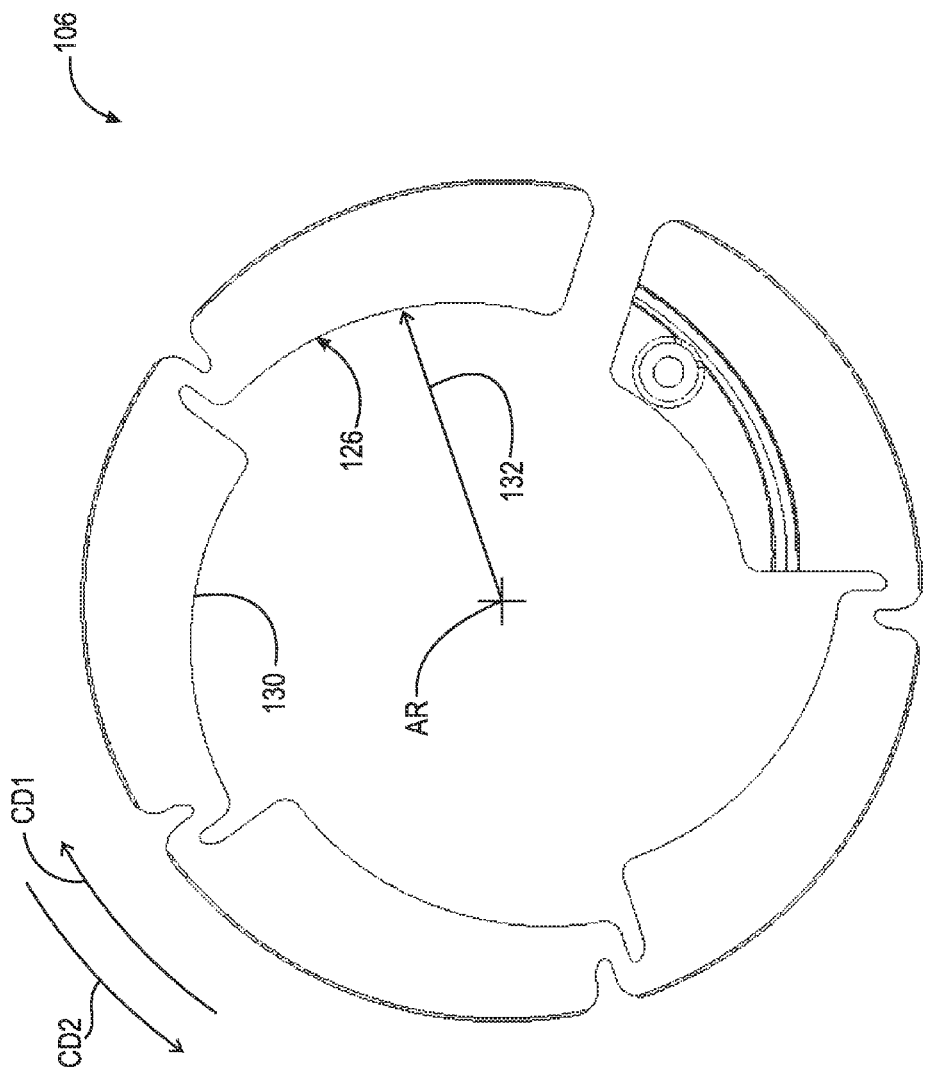
FIG. 6A is a front view of one wedge plate for the camshaft phaser in FIGS. 2A and 2B.

FIG. 6A is a front view of wedge plate 106 for camshaft phaser 100 in FIGS. 2A and 2B.

Figure 6B:
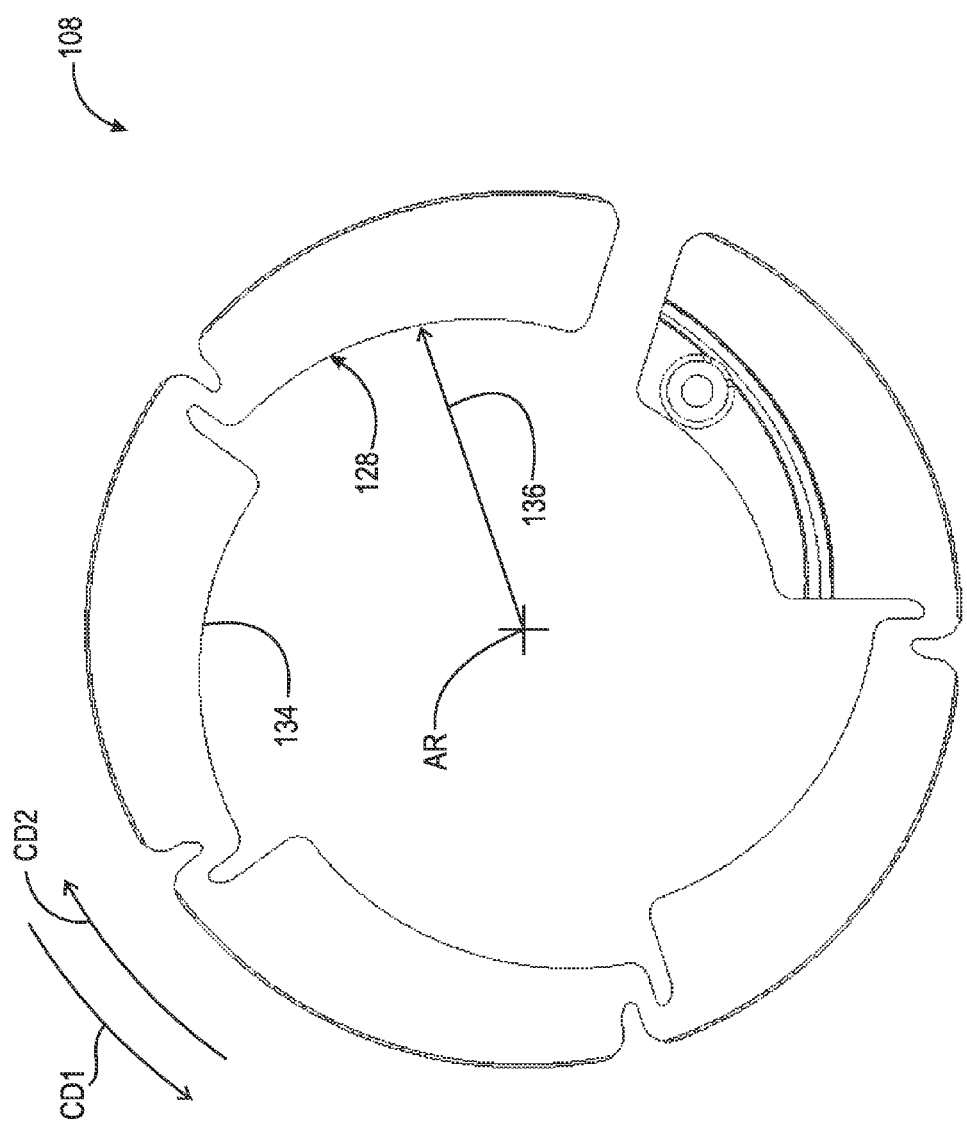
FIG. 6B is a rear view of another wedge plate for the camshaft phaser in FIGS. 2A and 2B.

FIG. 6B is a rear view of wedge plate 108 for camshaft phaser 100 in FIGS. 2A and 2B. The following should be viewed in light of FIGS. 2 through 6B. Wedge plate 106 includes circumferentially disposed ramps 126 engaged or engageable with ramps 114. Wedge plate 108 includes circumferentially disposed ramps 128 engaged with or engageable with ramps 116. Radially innermost surface 130 of ramps 126 extend further in radially inner direction RD2 along circumferential direction CD1. That is, radial distance 132 decreases along direction CD1. Radially innermost surface 134 of ramps 128 extend further in direction RD2 along circumferential direction CD2. That is, radial distance 136 decreases along direction CD2.

Figure 7A:
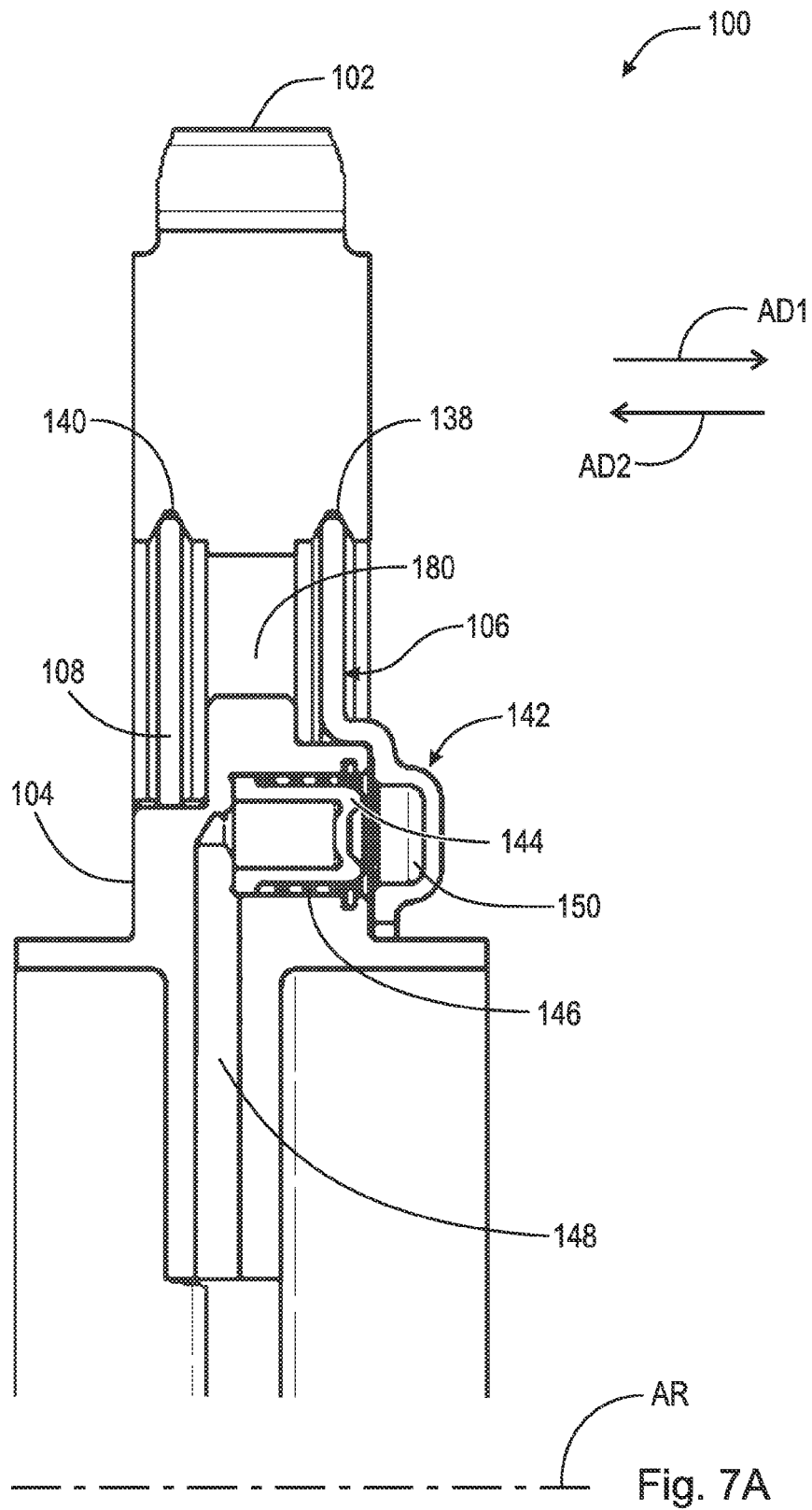
FIG. 7A is a cross-sectional view generally along line 7-7 in FIG. 2A with a locking pin assembly in a disengaged mode.

FIG. 7A is a cross-sectional view generally along line 7-7 in FIG. 2A with a locking pin assembly in a disengaged mode.

Figure 7B:
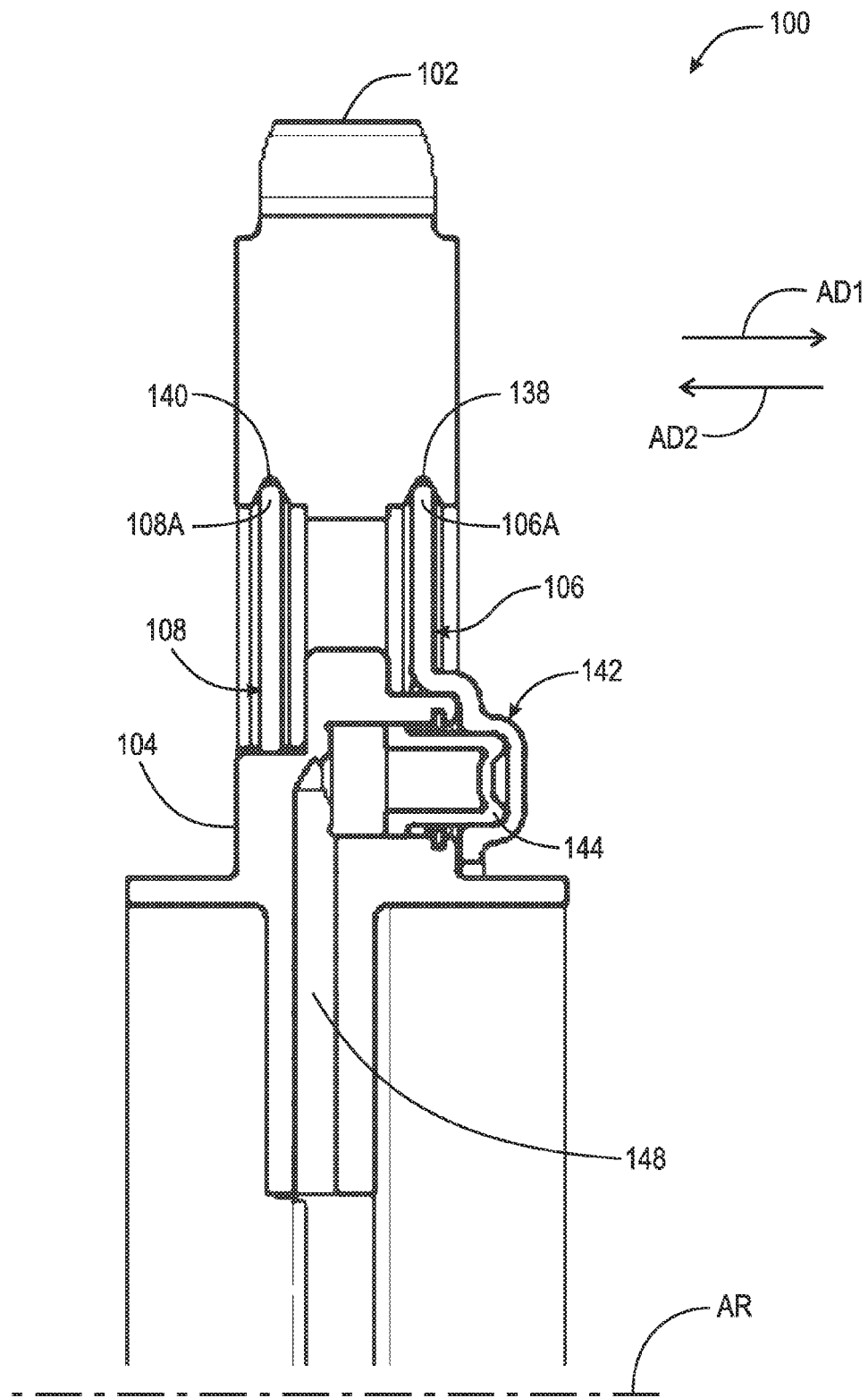
FIG. 7B is a cross-sectional view generally along line 7-7 in FIG. 2A with a locking pin assembly in an engaged mode.

FIG. 7B is a cross-sectional view generally along line 7-7 in FIG. 2A with a locking pin assembly in an engaged mode. The following should be viewed in light of FIGS. 2 through 7B. In an example embodiment, stator 102 includes grooves 138 and 140. Radially outermost portion 106A of wedge plate 106 is at least partially disposed in groove 138 and frictionally engaged with groove 138. Radially outermost portion 108A of wedge plate 108 is at least partially disposed in groove 140 and frictionally engaged with groove 140. Due to the frictional engagement between wedge plates 106 and 108 and grooves 138 and 140, respectively, wedge plates 106 and 108 rotate with the stator except as noted. In an example embodiment (not shown), grooves 138 and 140 are formed in respective annular components formed separately from stator 102 and fixedly connected to stator 102.

Rotor 104 includes locking pin assembly 142 with locking pin 144. Pin 144 is displaceable in axial direction AD1 to engage wedge plate 106 and non-rotatably connected rotor 104 and wedge plate 106. In an example embodiment, assembly 142 includes spring 146 urging pin 144 in direction AD2 into the disengaged mode shown in FIG. 7A. In an example embodiment, hydraulic pressure via channel 148 overcomes spring 146 and displaces pin 144 in direction AD1, for example into pocket 150 in plate 106 so that assembly 142 is in the engaged mode shown in FIG. 7B.

FIG. 8A is a cross-sectional view generally along line 8-8 in FIG. 2B with a locking pin assembly in a disengaged mode.

Figure 8B:
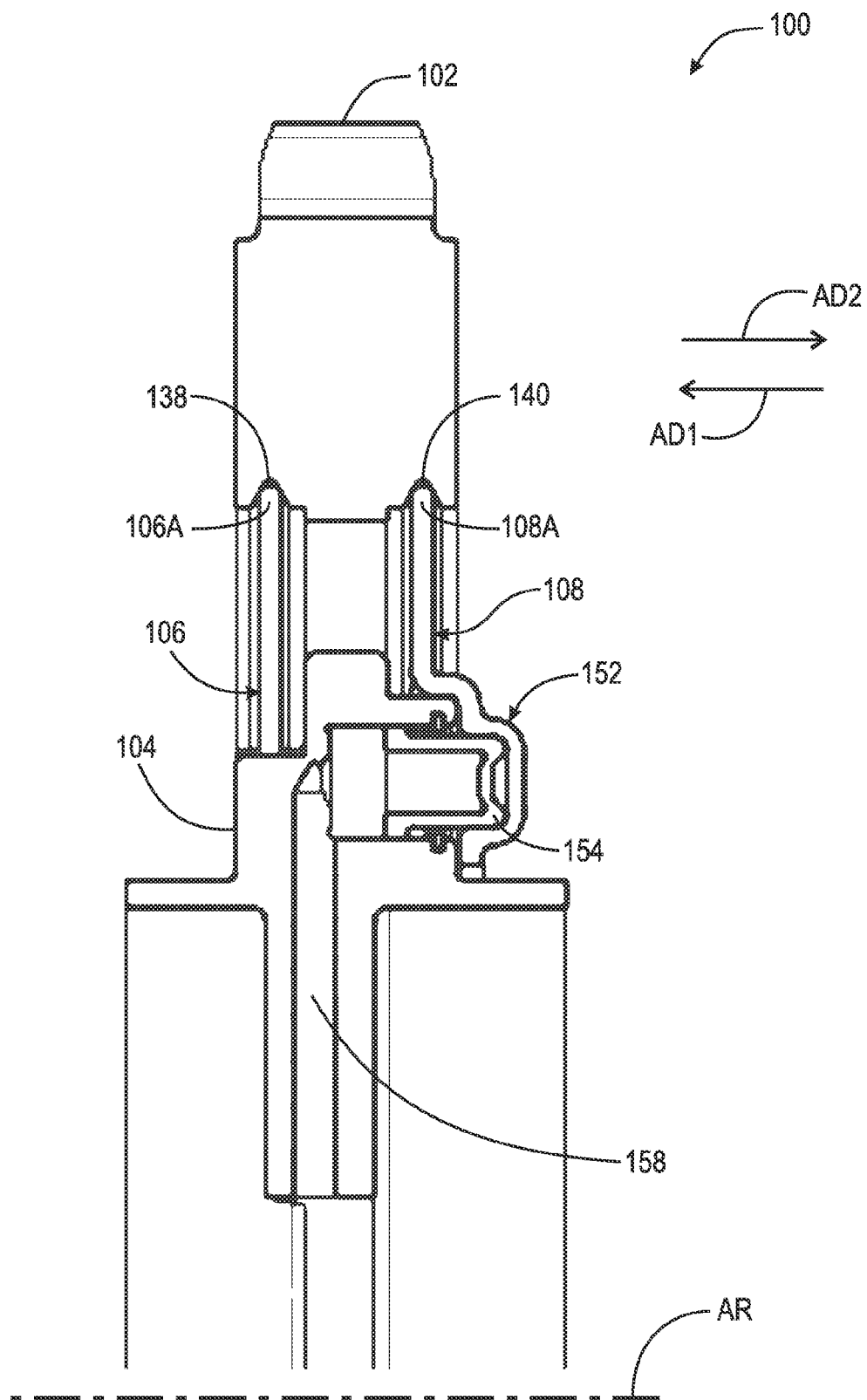
FIG. 8B is a cross-sectional view generally along line 8-8 in FIG. 2B with a locking pin assembly in an engaged mode.

FIG. 8B is a cross-sectional view generally along line 8-8 in FIG. 2B with a locking pin assembly in an engaged mode. The following should be viewed in light of FIGS. 2 through 8B. Rotor 104 includes locking pin assembly 152 with locking pin 154. Pin 154 is displaceable in axial direction AD2 to engage wedge plate 108 and non-rotatably connected rotor 104 and wedge plate 108. In an example embodiment, assembly 152 includes spring 156 urging pin 154 in direction AD1 into the disengaged mode shown in FIG. 8A. In an example embodiment, hydraulic pressure via channel 158 overcomes spring 156 and displaces pin 154 in direction AD2, for example into pocket 160 in plate 108 so that assembly 152 is in the engaged mode shown in FIG. 8B. Although pockets 150 and 160 are shown, openings in wedge plates 106 and 108 can be used to engage pins 144 and 154, respectively.

Figure 9:
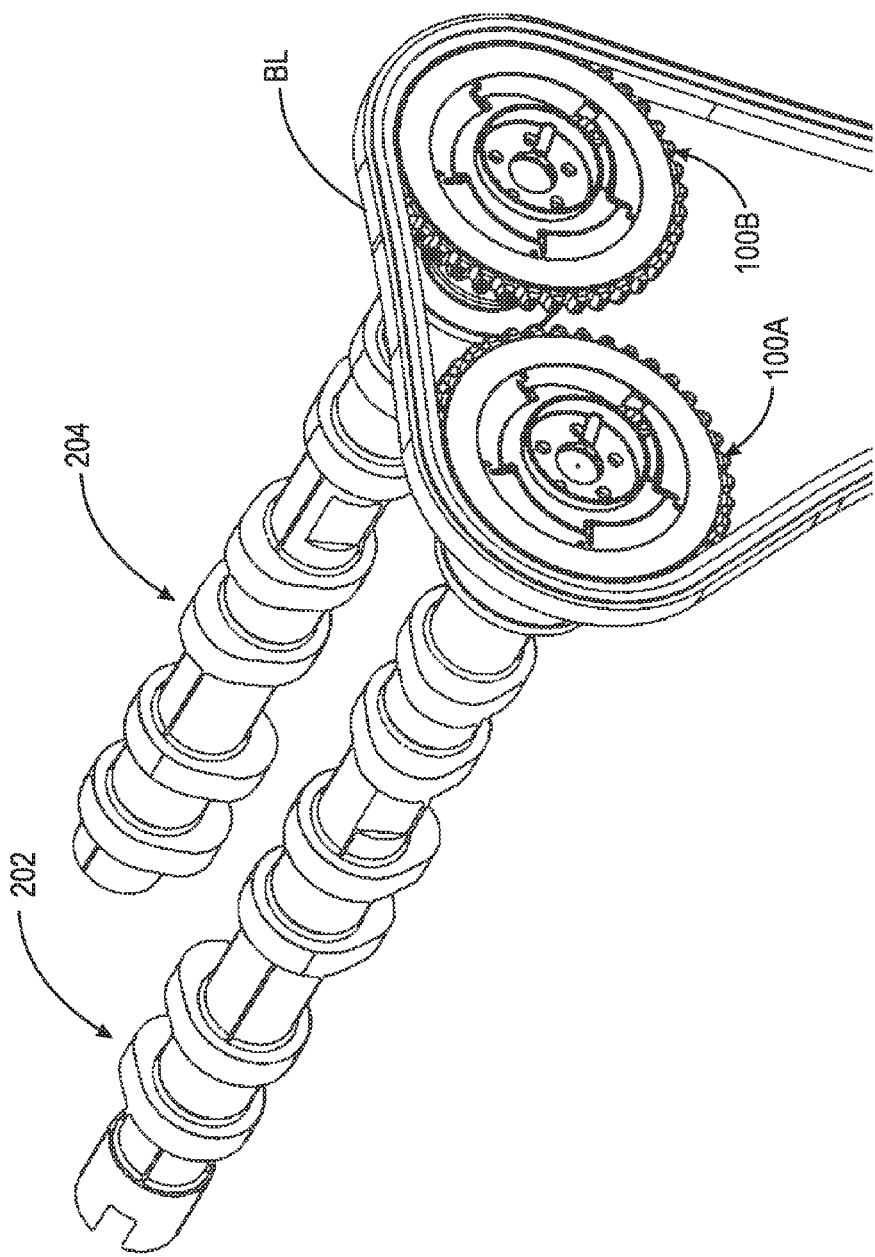
FIG. 9 is a perspective view of two camshaft phasers, as shown in FIGS. 2A and 2B, connected to respective cam shafts.

FIG. 9 is a perspective view of camshaft phasers 100A and 100B as shown in FIGS. 2A and 2B, connected to cam shafts 202 and 204, respectively. The discussion regarding phaser 100 is applicable to phasers 100A and 100B. Typically one of cam shafts 202 and 204 is for an intake valve train and the other of cam shafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is applicable to both of phasers 100A and 100B; however phaser 100A is referenced in the discussion that follows.

Phaser 100A is configured to operate in at least three modes: a drive mode; a phase advance mode; and a phase retard mode. In the drive mode, the stator receives rotational torque from chain or belt BL, for example in direction CD1. Due to the interaction of rotor 104 and wedge plates 106 or 108, rotation of stator 102 in direction CD1 is transmitted to rotor 104 and rotor 104 rotates in phase with stator 102, within the context of the torsional forces (explained below) from camshaft 202, as follows. The operation in drive mode can be divided into first and second phases. In the first phase, stator 102, wedge plate 106, and rotor 104 are non-rotatably connected to transmit rotation of the stator to the rotor and wedge plate 108 is rotatable with respect to stator 102. Thus, rotation and torque is transmitted by wedge plate 106 and not wedge plate 108. In the second phase, stator 102, wedge plate 108, and rotor 104 are non-rotatably connected to transmit rotation of the stator to the rotor and wedge plate 106 is rotatable with respect to stator 102. Thus, rotation and torque is transmitted by wedge plate 108 and not wedge plate 106.

The non-rotatable engagement of stator 102, wedge plate 106, and rotor 104 is due to, for example, ramps 126 sliding up ramps 114 in direction CD2. Since distance 120 increases in direction CD2 and distance 132 decreases in direction CD1, wedge plate 106 is forced radially outward and rotationally locks with stator 102 and rotor 104. In particular, ramps 114 and 126 are frictionally and compressively locked and outer portion 106A is frictionally and compressively locked in groove 138.

The non-rotatable engagement of stator 102, wedge plate 108, and rotor 104 is due to, for example, ramps 128 sliding up ramps 116 in direction CD1. Since distance 124 increases in direction CD1 and distance 136 decreases in direction CD2, wedge plate 108 is forced radially outward and rotationally locks with stator 102 and rotor 104. In particular, ramps 116 and 128 are frictionally and compressively locked and outer portion 108A is frictionally and compressively locked in groove 140.

As is known in the art, torsional forces T1 and T2 are transmitted from camshaft 202, in directions CD1 and CD2, respectively, to rotor 104 during operation of phaser 100. The torsional force forces are due to interaction of cam lobes (not shown) on camshaft 202 with various components of a valve train (not shown) of which camshaft 202 is a part. Torsional forces T1 and T2 are transmitted in a repeating cycle. Rotor 104 continues to rotate in direction CD1 in the current example (stator 104 rotating in direction CD1); however, torsional force T1 causes a relative rotation of rotor 104 in direction CD1 with respect to the stator and torsional force T2 causes a relative rotation of rotor 104 in direction CD2 with respect to the stator. Transmission of torsional force T1 is associated with the first phase in drive mode and transmission of torsional force T2 is associated with the second phase in drive mode in the present example.

To explain the drive mode, we start with phaser 100 operating in the second phase. That is, stator 102, wedge plate 108, and rotor 104 are non-rotatably connected. To initiate the transition from the second phase to the first phase, torsional force T1 is transmitted to rotor 104, causing rotor 104 to rotate in direction CD1 with respect to stator 102 and wedge plate 108. Since distance 124 decreases in direction CD2 and distance 136 increases in direction CD1, as rotor 104 is urged in direction CD1, ramps 128 slide down ramps 116 and the frictional and compressive engagement of stator 102, wedge plate 108, and rotor 104 decreases. At the same time, the rotation of rotor 104 in direction CD1 causes ramps 126 to slide up ramps 114 in direction CD2 and stator 102, wedge plate 106, and rotor 104 begin to engage. The configuration of rotor 104 and wedge plates 106 and 108 is determined such that as the non-rotatable connection of stator 102, wedge plate 108, and rotor 104 is terminating, the non-rotatable connection of stator 102, wedge plate 106, and rotor 104 is being established, providing a smooth and continuous transfer of rotation from the stator to rotor 104.

To initiate the transition from the first phase to the second phase, torsional force T2 is transmitted to rotor 104, causing rotor 104 to rotate in direction CD2 with respect to stator 102 and wedge plate 106. Since distance 120 decreases in direction CD1 and distance 132 increases in direction CD2, as rotor 104 rotates in direction CD2, ramps 126 slide down ramps 114 and the frictional and compressive engagement of stator 102, wedge plate 106, and rotor 104 decreases. At the same time, the rotation of rotor 104 in direction CD2 causes ramps 128 to slide up ramps 116 in direction CD1 and stator 102, wedge plate 108, and rotor 104 engage. The configuration of rotor 104 and wedge plates 106 and 108 is determined such that as the non-rotatable connection of rotor 104, plate 106, and stator 102 is terminating, the non-rotatable connection of stator 102, wedge plate 108, and rotor 104 is being established, providing a smooth and continuous transfer of rotation from the stator to rotor 104.

The following describes the phase advance mode. In the course of cycling between the first and second phases of the drive mode, rotor 104 rotates distances 162A and 168A, with respect to the stator, in directions CD1 and CD2, respectively, due to torsional forces T1 and T2, respectively. The configuration, noted above, of rotor 104 and wedge plates 106 and 108 results in distances 162A and 168A being nominal or negligible; however, for purposes of illustration, distances 162A and 168A have been exaggerated in FIG. 2A. The following is an example of initiating and executing the phase advance mode. Assume phaser 100 is in the second phase and receives torsional force T1 to initiate the first phase. The non-rotational connection of stator 102, wedge plate 108, and rotor 104 begins to loosen as described above. However, before ramps 126 can slide up ramps 114, or before ramps 126 slide up ramps 114 far enough to non-rotatably engage stator 102, wedge plate 106, and rotor 104, pin 144 is displaced in direction AD1 to non-rotatably connect rotor 104 and wedge plate 106. Thus, as torsional force T1 displaces rotor 104 in direction CD1, ramps 114 and 126 do not engage as required for the first phase and rotor 104 is free to rotate distance 162B, in direction CD1, beyond distance 162A. As torsional force T2 is received by rotor 104, the second phase of the drive mode is executed as normal.

Thus, for each cycle of the first and second drive mode phases and torsional force forces T1 and T2, while wedge plate 106 is non-rotatably connected to rotor 104, the relative position of rotor 104 with respect to stator 102 shifts in direction CD1 by distance 162B. This process is repeatable via successive cycles of the first and second drive mode phases and torsional force forces T1 and T2 to attain the desired shift of rotor 104. To terminate the shifting of rotor 104 in direction CD1, pin 144 is displaced, after transmission of torsional force T2 and prior to transmission of torsional force T1, in direction AD2 to enable rotation of wedge plate 106 with respect to rotor 104. Rotor 104 still oscillates due to torsional force forces T1 and T2, but within the frame of reference of the oscillations, the rotational position of rotor 104 with respect to stator 102 has been shifted.

Each distance 162B in direction CD1 is a result of phaser 100 implementing a full cycle of the first and second phases of the drive mode, or stated otherwise, receipt of a full cycle of torsional force forces T1 and T2. To shift rotor 104 in direction CD1 by an amount less than distance 162B, pin 144 is displaced in direction AD2 to disengage from wedge plate 106 before the transition from the first phase to the second phase. That is, rotation of wedge plate 106 is enabled during the first phase so that ramps 114 and 126 engage and rotationally lock after rotor 104 has displaced distance 162A, but prior to rotor 104 displacing distance 162B.

The following is an example of initiating and executing the phase retard mode. Assume stator 102 is rotating in direction CD1. Assume phaser 100 is in the first phase and receives torsional force T2 to initiate the second phase. The non-rotational connection of stator 102, wedge plate 106, and rotor 104 begins to loosen as described above. However, before ramps 128 can slide up ramps 116, or before ramps 128 slide up ramps 116 far enough to non-rotatably engage stator 102, wedge plate 108, and rotor 104, pin 154 is displaced in direction AD2 to non-rotatably connect rotor 104 and wedge plate 108. Thus, as torsional force T2 displaces rotor 104 in direction CD2, ramps 116 and 128 do not engage as required for the second phase and rotor 104 is free to rotate distance 168B in direction CD2, beyond distance 168A. As torsional force T1 is received by rotor 104, the first phase of the drive mode is executed as normal.

Thus, for each cycle of the first and second drive mode phases and torsional force forces T1 and T2, while wedge plate 108 is non-rotatably connected to rotor 104, the relative position of rotor 104 with respect to stator 102 shifts in direction CD2 by distance 168B. This process is repeatable via successive cycles of the first and second drive mode phases and torsional force forces T1 and T2 to attain the desired shift of rotor 104. To terminate the shifting of rotor 104 in direction CD2, pin 154 is displaced, after transmission of torsional force T1 and prior to transmission of torsional force T2, in direction AD1 to enable rotation of wedge plate 108 with respect to rotor 104. Rotor 104 still oscillates due to torsional force forces T1 and T2, but within the frame of reference of the oscillations, the rotational position of rotor 104 with respect to stator 102 has been shifted.

Each distance 168B is a result of phaser 100 implementing a full cycle of the first and second phases of the drive mode, or stated otherwise, receipt of a full cycle of torsional forces T1 and T2. To shift rotor 104 in direction CD2 by an amount less than distance 168B, pin 154 is displaced in direction AD1 to disengage from wedge plate 108 before the transition from the second phase to the first phase. That is, rotation of wedge plate 108 is enabled during the second phase so that ramps 116 and 128 engage and rotationally lock after rotor 104 has displaced distance 168A, but prior to rotor 104 displacing distance 168B.

Figure 10:
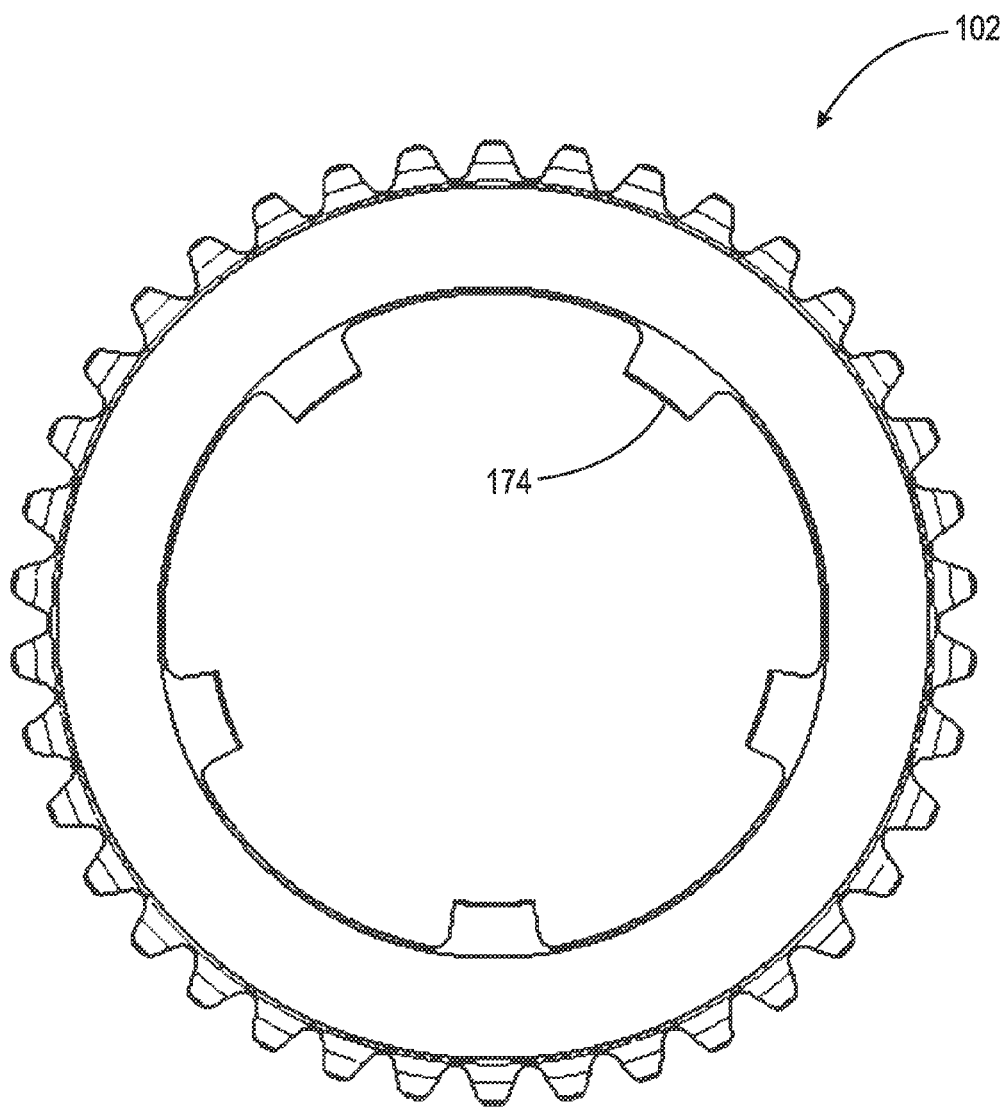
FIG. 10 is a front view of a stator for the camshaft phaser in FIGS. 2A and 2B.

FIG. 10 is a front view of stator 102 for camshaft phaser 100 in FIGS. 2A and 2B. In an example embodiment, stator 102 includes at least one radially inwardly projecting protrusion 174 and rotor 104 includes at least one radially outwardly projecting protrusions 176. Protrusion(s) 176 are configured to contact protrusion(s) 174 to limit a degree to which the rotational position of rotor 104 can be shifted with respect to stator 102.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
a rotatable stator including a radially inner side with first and second grooves;
a rotatable rotor arranged to non-rotatably connect to a camshaft and including a radially outer surface including:
a first plurality of circumferentially disposed ramps, a respective radially outermost surface of each ramp in the first plurality of circumferentially disposed ramps extending further in a radially outer direction along a first circumferential direction; and,
a second plurality of circumferentially disposed ramps, a respective radially outermost surface of each ramp in the second plurality of circumferentially disposed ramps extending further in a radially outer direction along a second circumferential direction, opposite the first circumferential direction;
a first wedge plate including:
a third plurality of circumferentially disposed ramps engaged with the first plurality of circumferentially disposed ramps; and,
a first radially outermost portion at least partially disposed in the first groove; and, a second wedge plate including:
a fourth plurality of circumferentially disposed ramps engaged with the second plurality of circumferentially disposed ramps; and,
a second radially outermost portion at least partially disposed in the second groove.

2. The camshaft phaser of claim 1, wherein in response to rotation of the stator, the first or second wedge plate is arranged to non-rotatably connect the rotor and the stator.

3. The camshaft phaser of claim 1, further comprising:
a first locking pin assembly including a first locking pin axially displaceable to engage the first wedge plate and non-rotatably connect the first wedge plate to the rotor; and,
a second locking pin assembly including a second locking pin axially displaceable to engage the second wedge plate and non-rotatably connect the second wedge plate to the rotor.

4. A camshaft assembly, comprising:
a camshaft phaser including:
a stator;
a rotor including:
a first plurality of circumferentially aligned ramps; and,
a second plurality of circumferentially aligned ramps offset from the first plurality of ramps in a first axial direction; and,
first and second wedge plates radially disposed between the rotor and the stator; and,
a camshaft non-rotatably connected to the rotor, wherein in a drive mode:
the stator is arranged to receive first torque and to rotate in a first direction;
the assembly is arranged to operate in successive cycles, each cycle including a first phase followed by a second phase;
in the first phase the first wedge plate non-rotatably connects the stator and the rotor while the second wedge plate is rotatable with respect to the stator; and, in the second phase, the second wedge plate non-rotatably connects the stator and the rotor while the first wedge plate is rotatable with respect to the stator.

5. The camshaft assembly of claim 4, wherein:
the stator includes a radially inner surface with first and second circumferentially extending grooves; and,
radially outermost portions of the first and second wedge plates are disposed in the first and second grooves, respectively.

6. The camshaft assembly of claim 4, wherein:
the first wedge plate includes a radially inner surface with a third plurality of ramps radially aligned with the first plurality of ramps;
the second wedge plate includes a radially inner surface with a fourth plurality of ramps radially aligned with the second plurality of ramps;
in the first phase, the first and third pluralities of ramps are non-rotatably connected; and, in the second phase, the second and fourth pluralities of ramps are non-rotatably connected.

7. The camshaft assembly of claim 4, wherein:
to shift to the second phase from the first phase, the rotor is arranged to:
receive second torque, in the first direction, from the camshaft; and,
rotate a first circumferential distance with respect to the stator in the first direction to non-rotatably connect the first wedge plate with the rotor and the stator; and,
to shift from the first phase to the second phase, the rotor is arranged to:
receive third torque, in a second direction, opposite the first direction, from the camshaft; and,
rotate the rotor a second circumferential distance with respect to the stator in the second direction to non-rotatably connect the second wedge plate with the rotor and the stator.

8. The camshaft assembly of claim 7, wherein:
the rotor includes a first locking pin assembly with a first locking pin; and,
to shift, in the first direction, a rotational position of the rotor with respect to the stator:
the first locking pin assembly is arranged to displace the first locking pin to engage the first wedge plate to non-rotatably connect the rotor and the first wedge plate;
the rotor is arranged to receive the second torque, in the first direction, from the camshaft; and,
the rotor is arranged to rotate a third circumferential distance, greater than the first circumferential distance, with respect to the stator in the first direction.

9. The camshaft assembly of claim 8, wherein for each cycle of the first and second phases and while the first locking pin is engaged with the first wedge plate, the rotational position of the rotor with respect to the stator is shifted further in the first direction by the third circumferential distance.

10. The camshaft assembly of claim 9, wherein to limit, for a cycle of the first and second phases, the shift of the rotor with respect to the stator in the first direction to a fourth circumferential distance less than the third circumferential distance, the first locking pin assembly is arranged to displace the first locking pin to disengage the first locking pin from the first wedge plate before the rotor has rotated the first circumferential distance in the first phase.

11. The camshaft assembly of claim 8, wherein to terminate the shifting of the rotational position of the rotor with respect to the stator in the first direction:
the first locking pin assembly is arranged to displace the first locking pin to disengage the first locking pin from the first wedge plate; and,
the first wedge plate is arranged to non-rotatably connect the rotor and the stator.

12. The camshaft assembly of claim 7, wherein:
the rotor includes a second locking pin assembly with a second locking pin; and,
to shift, in the second direction, a rotational position of the rotor with respect to the stator:
the second locking pin assembly is arranged to displace the second locking pin to engage the second wedge plate to non-rotatably connect the rotor and the second wedge plate;
the rotor is arranged to receive the third torque, in the second direction, from the camshaft; and,
the rotor is arranged to rotate a third circumferential distance, greater than the second circumferential distance, with respect to the stator in the second direction.

13. The camshaft assembly of claim 12, wherein for each cycle of the first and second phases and while the second locking pin is engaged with the second wedge plate, the rotational position of the rotor with respect to the stator is shifted further in the second direction by the third circumferential distance.

14. The camshaft assembly of claim 13, wherein to limit, for a cycle of the first and second phases, the shift of the rotor with respect to the stator in the second direction to a fourth circumferential distance less than the third circumferential distance, the second locking pin assembly is arranged to displace the second locking pin to disengage the second locking pin from the second wedge plate before the rotor has rotated the second circumferential distance in the second phase.

15. The camshaft assembly of claim 12, wherein to terminate the shifting of the rotational position of the rotor with respect to the stator in the second direction:
the second locking pin assembly is arranged to displace the second locking pin to disengage the second locking pin from the second wedge plate; and,
the second wedge plate is arranged to non-rotatably connect the rotor and the stator.

16. The camshaft assembly of claim 4, wherein:
the stator includes at least one radially inwardly extending protrusion; and,
the rotor includes at least one radially outwardly extending protrusion arranged to engage the at least one radially inwardly extending protrusion to limit relative rotation between the rotor and the stator.

17. A method of phasing a camshaft, comprising:
engaging a radially outermost portion of a first wedge plate with a stator for a camshaft phaser;
engaging a first plurality of ramps on the first wedge plate with a second plurality of ramps on a rotor for the camshaft phaser;
engaging a radially outermost portion of a second wedge plate with the stator;
engaging a third plurality of ramps on the second wedge plate with a fourth plurality of ramps on the rotor;
rotating the stator in a first direction;
rotating, via contact with the stator, the first wedge plate in the first direction;
transmitting first torque in the first direction from a camshaft to the rotor;
rotating the rotor a first circumferential distance in the first direction with respect to the stator;

sliding the second plurality of ramps along the first plurality of ramps to displace the first wedge plate radially outward;
non-rotatably connecting the rotor, the first wedge plate, and the stator;
transmitting second torque in a second direction, opposite the first direction, from the camshaft to the rotor;
rotating the rotor a second circumferential distance in the second direction with respect to the stator;
sliding the fourth plurality of ramps along the third plurality of ramps to displace the second wedge plate radially outward; and,
non-rotatably connecting the rotor, the second wedge plate, and the stator.

18. The method of claim 17, further comprising:
displacing, while sliding the second plurality of ramps along the first plurality of ramps, the fourth plurality of ramps with respect to the third plurality of ramps;
rotating the stator with respect to the second wedge plate;
displacing, while sliding the fourth plurality of ramps along the third plurality of ramps, the second plurality of ramps with respect to the first plurality of ramps; and,
rotating the stator with respect to the first wedge plate.

19. The method of claim 17, further comprising:
shifting a rotational position of the rotor with respect to the stator in the first direction by:
displacing a locking pin for a locking pin assembly to engage the first wedge plate;
non-rotatably connecting the rotor and the first wedge plate;
transmitting the first torque in the first direction, from the camshaft to the rotor; and,
rotating the rotor a third circumferential distance, greater than the first circumferential distance, in the first direction with respect to the stator.

20. The method of claim 17, further comprising:
shifting a rotational position of the rotor with respect to the stator in the second direction by:
displacing a locking pin for a locking pin assembly to engage the second wedge plate;
non-rotatably connecting the rotor and the second wedge plate;
transmitting the second torque in the second direction, from the camshaft to the rotor; and,
rotating the rotor a third circumferential distance, greater than the second circumferential distance, in the second direction with respect to the stator.

* * * * *